United States Patent [19]
Sugiyama et al.

[11] Patent Number: 5,393,316
[45] Date of Patent: Feb. 28, 1995

[54] GLASS PLATE BEND-SHAPING APPARATUS AND METHOD OF BEND-SHAPING A GLASS PLATE

[75] Inventors: Tatsuo Sugiyama; Kenji Maeda, both of Aichi, Japan

[73] Assignee: Asahi Glass Company Ltd., Tokyo, Japan

[21] Appl. No.: 143,067

[22] Filed: Oct. 29, 1993

[30] Foreign Application Priority Data

Oct. 30, 1992 [JP] Japan .................................. 4-316223

[51] Int. Cl.6 ............................................. C03B 23/03
[52] U.S. Cl. ...................................... 65/106; 65/273; 65/289
[58] Field of Search ...................... 65/106, 182.2, 273, 65/289

[56] References Cited

U.S. PATENT DOCUMENTS

5,004,491  4/1991  McMaster et al. .
5,066,321  11/1991  Kramer et al. ......................... 65/289

*Primary Examiner*—Joye L. Woodard
*Attorney, Agent, or Firm*—Oblon, Spivak, McClelland, Maier, & Neustadt

[57] ABSTRACT

A glass plate is bend-shaped by transferring a glass plate by way of transferring rollers in a heating furnace; sucking and suspending the glass plate by way of a glass plate sucking and suspending device which is disposed in the heating furnace and at the downstream side of the transferring rollers; moving arms of a positioning device disposed at the lower portion of the glass plate sucking and suspending device in the direction parallel to a glass plate suspension surface of the glass plate sucking and suspending device; sucking and suspending glass plate supporting portions each connected to the top end of each of the arms by interposing a joint portion so as to keep the distance between the glass plate supporting portions and the glass plate sucking and suspending device at a predetermined value; supporting edge portion of the glass plate by the glass plate supporting portions, and positioning the glass plate to a predetermined position by advancing and retracting the arms in the direction parallel to the suspension surface; moving the glass plate sucking and suspension device to the upper portion of a bending mold which the glass plate is sucked and suspended; placing the glass plate on the bending mold; and bending the glass plate on the mold.

6 Claims, 3 Drawing Sheets

GLASS PLATE BEND-SHAPING APPARATUS AND METHOD OF BEND-SHAPING A GLASS PLATE

BACKGROUND OF THE INVENTION

1. Field of The Invention

The present invention relates to a glass plate bend-shaping apparatus and a method of bend-shaping a glass plate such as a window glass or the like for a vehicle. Particularly, the present invention relates to a bend-shaping apparatus provided with a positioning means for bend-shaping a front glass for a vehicle and a method of bend-shaping the front glass.

2. Discussion of Background

Generally, a glass plate used for, for instance, a window glass for a vehicle has been bend-shaped into a predetermined shape so as to meet the shape of a vehicle body or to obtain a streamline shape so that the resistance of air during cruising can be reduced. In bend-shaping the glass plate, a method of deadweight bending wherein a softened glass plate is mounted on a ring-like bending mold or a method using a vertical pressing furnace or a horizontal bending furnace has been conducted.

An example of the bend-shaping method using a horizontal bending furnace is disclosed in, for instance, U.S. Pat. No. 5,004,491. Namely, a glass plate heated in a heating furnace is transferred into a horizontal bending furnace by means of a transferring means comprising rollers. When the glass plate is moved to around the terminal point at a downstream portion in the horizontal bending furnace, the glass plate is held by a glass plate sucking and suspending device which is disposed at an upper portion of the furnace and the downstream side of the transferring means and which comprises an air suspension block (hereinbelow referred to as ASB) in which a number of orifices for ejecting air and a number of orifices for sucking air are formed in the entire area of the suspension surface of the device, by which the glass plate is held below the glass plate sucking and suspending device by a sucking force when air is sucked through the number of orifices.

The glass plate held below the glass plate sucking and suspending device is put on a lower mold for bend-shaping (hereinbelow, referred to as a lower mold) which is disposed below the glass plate sucking and suspending device. In this case, the glass plate is moved to the upper portion of the lower mold by means of the glass plate sucking and suspending device. Accordingly, there is no danger of the inclination or the deformation of the glass plate on the lower mold, and it can be correctly put on the lower mold. Then, the glass plate is pressed by lowering an upper mold for bend-shaping (hereinbelow, referred to as an upper mold) to the lower mold.

In order to fit the glass plate which has been bend-shaped to a vehicle body, the glass plate must be correctly bend-shaped so as to meet the shape of the vehicle body. In particular, when a laminated glass wherein an interlayer film such as a polyvinylbutyral film or the like is interposed between two glass plates for lamination is used for a front glass for a vehicle, it is necessary that the radius of curvature at any lamination part of the two glass plates corresponds, in its entirety or a partial portion, to each other when the laminated glass has been prepared. Otherwise, the glass plates may be broken in a pressing process in the manufacture of the laminated glass, may result in bubbles in the bonding plane in a long term use, or may result in peeling-off in the bonding plane. Accordingly, when the laminated glass having a curved surface is prepared, it is necessary to meet the radius of curvature in the laminated portion between the two glass plates. This requires the correct shaping of the laminated glass in comparison with the manufacture of a single plate glass window.

Since the shape and the radius of the curvature of the bend-shaped glass plate depend on the shape of a bend-shaping mold, the glass plate must be correctly put at a predetermined position on the lower mold so that a bend-shaping operation is precisely conducted. For this, it is necessary to put the glass plate on the bend-shaping mold after they have been correctly positioned and held by the sucking function of the glass plate sucking and suspending device. Specifically, a positioning means is provided below the ASB so that the positioning means is moved in parallel to the suspending surface of the ASB. The positioning means comprises metallic arm portions which are provided at both sides of the outside of the furnace and advanced into or retracted from the furnace, a glass plate supporting portion consisting of metallic circular plates provided at each of the top end of the arms. The glass plate is received by the glass plate supporting portions and is held at a predetermined position, and then, the glass plate is put on the lower mold.

In the above-mentioned bend-shaping apparatus, the glass plate is sucked by the glass plate sucking and suspending device so that it is suspended in a non-contact state at a position of about several mm, e.g. less than 1 mm away from the lower suspension surface of the glass plate sucking and suspending device. Accordingly, it was necessary to precisely control the distance between the glass plate sucking and suspending device and the arm portions of the positioning means so that the glass plate supporting portions can correctly support edges of the glass plate.

Figure 6:
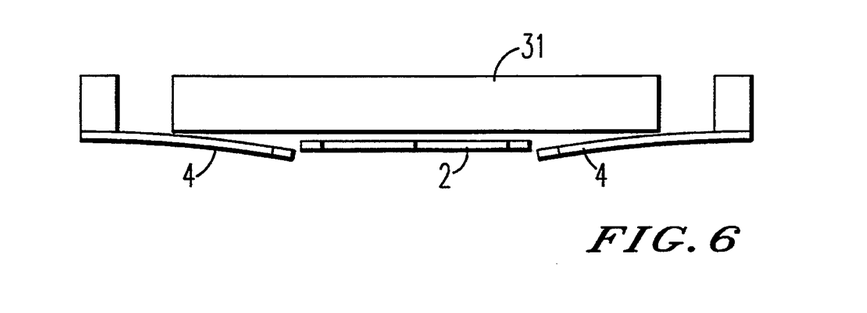
FIG. 6 is a schematic view showing a conventional positioning means.

Since the positioning means of the conventional bend-shaping apparatus was so constructed as to advance to and retract from the furnace from the right and left sides of the furnace, the metallic arm portions were bent or deformed due to a temperature change in the advancing and retracting movements from the atmospheric temperature zone to the heating zone, or the repeating and stopping of a shaping cycle, whereby the distance between the glass plate and the glass plate sucking and suspending device differed from the distance between the glass plate supporting portions and the glass plate sucking and suspending device (FIG. 6). Accordingly, it was difficult to precisely put the glass plate on the bend-shaping mold.

When the bending of the arm portions resulted, it was necessary to adjust the height and the position of the arm portions in order to conduct precise positioning of the glass plate on the bend-shaping mold, this required the interruption of the bend-shaping processes, and much time and labor.

SUMMARY OF THE INVENTION

It is an object of the present invention to eliminate the disadvantage of the conventional technique and to provide an improved glass plate bend-shaping apparatus and an improved method of bend-shaping a laminated glass.

According to the present invention, there is provided a glass plate bend-shaping apparatus which comprises:

a transferring means for transferring a glass plate in a heating furnace, a bend-shaping mold disposed at the downstream side of the transferring means to shape the glass plate softened by heat in the heating furnace, a glass plate sucking and suspending device disposed at an upper portion in the heating furnace and the downstream side of the transferring means to put the glass plate from the transferring means onto the bend-shaping mold, and a positioning means for positioning the glass plate at a predetermined position with respect to the glass plate sucking and suspending device, wherein the positioning means comprises:

arm portions which are disposed below the glass plate sucking and suspending device, and are capable of advancing and retracting in the direction substantially parallel to the glass plate suspension surface of the glass plate sucking and suspending device, glass plate supporting portions each provided at the top end of each of the arm portions to support an edge portion of the glass plate transferred, and joint portions each connecting the arm portion and the glass plate supporting portion, and wherein each of the glass plate supporting portions is connected to each of the arm portions through the joint portion so as to advance and retract in the direction parallel to the glass plate suspension surface in association with the movement of the arm portion in the direction parallel to the suspension surface while the glass plate supporting portions are held by the glass plate sucking and suspending device to have a predetermined gap therebetween with respect to the direction substantially parallel to the glass plate suspension surface of the glass plate sucking and suspending device, and each of the glass plate supporting portions is connected to each of the arm portions through the joint portion so that the distance in the vertical direction between the arm portion and the glass plate supporting portion is adjustable so as to keep the gap between the glass plate supporting portion and the glass plate sucking and suspending device constant with respect to the direction substantially vertical to the glass plate suspension surface.

In a preferred embodiment of the present invention, a guide member is provided in each of the glass plate supporting portions so that it extends in the direction substantially perpendicular to the suspension surface of the glass plate sucking and suspending device, and the guide member is inserted into an inserting portion formed in the joint portion provided at the top end of each of the arm portions, the inserting portion being extended in the direction substantially perpendicular to the suspension surface of the glass plate sucking and suspending device.

As a preferred embodiment of the present invention, the joint portion is in substantially a spherical shape and is fitted to a curved recess portion formed in the top end of each of the arm portions. As a preferred embodiment of the present invention, at least one of the group consisting of the arm portions and the glass plate supporting portions is formed of silicon carbide ceramics or silicon nitride ceramics.

Further, as a preferred embodiment of the present invention, an air-blasting means is provided in each of the arm portions at a position opposite the joint portion, whereby air from the air-blasting means is directed to the glass plate supporting portion through the inserting portion via the inside of the arm portion to thereby float the glass plate supporting portion.

Further, in accordance with the present invention, there is provided a method of bend-shaping a glass plate which comprises:

transferring a glass plate by means of a transferring means in a heating furnace;

sucking and suspending the glass plate by means of a glass plate sucking and suspending device which is disposed in the heating furnace and at the downstream side of the transferring means;

moving arm portions of a positioning means disposed at the lower portion of the glass plate sucking and suspending device in the direction in substantially parallel to a glass plate suspension surface of the glass plate sucking and suspending device;

sucking and suspending glass plate supporting portions each connected to the top end of each of the arm portions by interposing a joint portion so as to keep the distance between the glass plate supporting portions and the glass plate sucking and suspending device at a predetermined value;

supporting edge portion of the glass plate by the glass plate supporting portions, and positioning the glass plate to a predetermined position by advancing and retracting the arm potion in the direction in parallel to the suspension surface;

moving the glass plate sucking and suspension device to the upper portion of a bending mold while the glass plate is sucked and suspended;

placing the glass plate on the bending mold; and bending the glass plate on the mold.

In accordance with the present invention, the glass plate supporting portions of the positioning means are sucked and suspended by the glass plate sucking and suspending device to keep a predetermined gap between the glass plate supporting portions and the glass plate sucking and suspending device, and the glass plate supporting portions can be determined at predetermined positions by the advancing and refracting movement of the arm portions of the positioning means in the direction parallel to the suspension surface of the glass plate sucking and suspending device. Therefore, the glass plate supporting portions are always kept to have the predetermined gap to the suspension surface of the device whereby the glass plate can be stopped at a correct position.

Further, in the present invention, even when the bending or the deformation of the arm portions are caused by heat in the furnace, the glass plate supporting portions and the arm portions are freely movable with respect to each other in the direction perpendicular to the suspension surface of the glass plate sucking and suspending device. Namely, when the arm portions are bent due to heat in the furnace, only the relation of the distance between the arm portions and the glass plate sucking and suspending device to the distance between the glass plate and the glass plate sucking and suspending device is changed, and the glass plate supporting portions are always kept at a predetermined level by the sucking and suspending function of the glass plate sucking and suspending device. Accordingly, correctness necessary for positioning the glass plate is not influenced by the deformation of the arm portions. Therefore, the correct positioning of the glass plate can be effected, and the glass plate is bend-shaped without the interruption of the bend-shaping processes and the adjustment of the arm portions.

Further, in accordance with the present invention, the arm portions of the positioning means do not contact with the glass plate sucking and suspending device, and the glass plate supporting portions are in a non-contact state to the glass plate sucking and suspending device. Accordingly, there is no danger of the wearing of the glass plate sucking and suspending device by the contact of the positioning means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Referring to the drawings, wherein the same reference numerals designate the same or corresponding parts.

Figure 1:
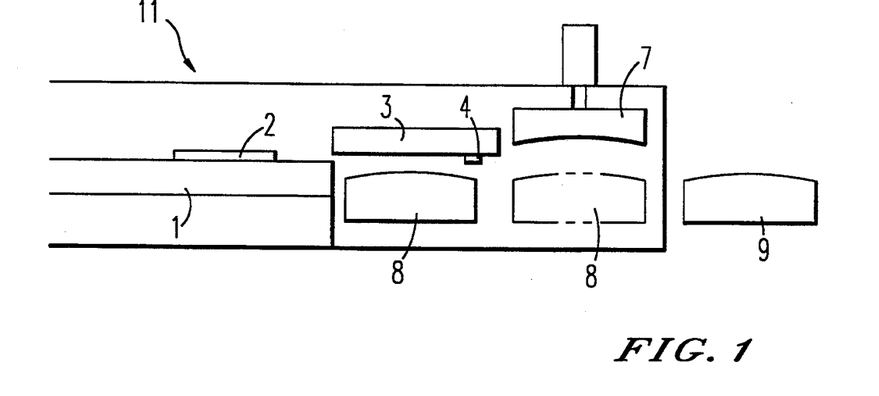
FIG. 1 is a schematical view in cross section showing an embodiment of the glass plate bend-shaping apparatus and the method of bend-shaping a glass plate according to the present invention.

In FIG. 1 showing an embodiment of the present invention, a transferring means 1 called an air floating bed (hereinbelow, referred to as AFB) is disposed in a heating furnace 11 whereby a glass plate is floated and transferred by ejecting hot air from the lower part of the glass plate 2. At the down-stream side of the transferring means 1, there is disposed a glass plate sucking and suspending device 3 comprising an air sucking block (ASB) which sucks and suspends the glass plate 2 and puts the glass plate 2 in a horizontal state on a lower mold for bend-shaping 8.

A positioning means 4 is arranged below the glass plate sucking and suspending device 3 so that the glass plate 2 transferred to the downstream side by means of the transferring means 1 is positioned at a predetermined position with respect to the glass plate sucking and suspending device 3. A bend-shaping means for bend-shaping the glass plate 2 softened by heat comprises upper and lower molds 7, 8 for bend-shaping. The lower mold 8 is moved to the lower portion of the upper mold 7 after it has received the glass plate 2, and then, press-bending is conducted to the glass plate 2. A gradually cooling means 9 may be disposed at the downstream side of the bend-shaping means.

With the bend-shaping apparatus having the construction described above, the shaping of the glass plate is conducted as follows:

The glass plate 2 is heated to a sufficient temperature, for instance, about 550° C.–650° C. in a heating furnace 11. Then, the heated glass plate is transferred by means of the transferring means 1, and it is sucked to and suspended by the glass plate sucking and suspending device 3 located at the downstream side of the transferring means 1. The position of the glass plate 2 is determined by the positioning means 4 arranged below the glass plate sucking and suspending device 3 so that the glass plate is placed at a predetermined position on the lower mold 8.

Further, the glass plate 2 is put on the lower mold 8 while it is sucked and suspended by the glass plate sucking and suspending device 3 at a predetermined position by means of the positioning means 4. Then, the lower mold 8 on which the glass plate 2 is put is moved to a position just below the upper mold 7. Then, the glass plate 2 is pressed by the cooperation of the upper and lower molds 7, 8. The press-shaped glass plate is transferred to the gradually cooling means 9.

Figure 2A:
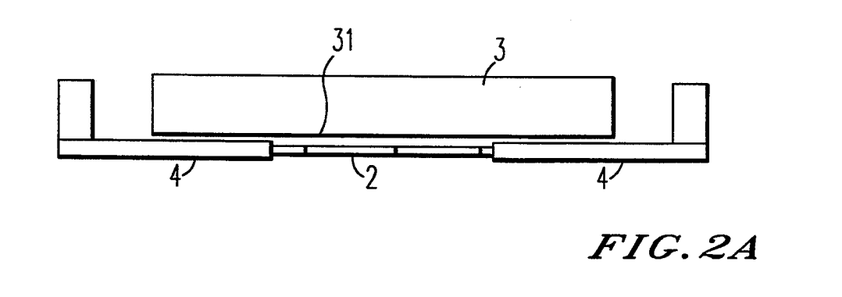
FIG. 2a is a side view showing an embodiment of a positioning means used for the present invention.
Figure 2B:
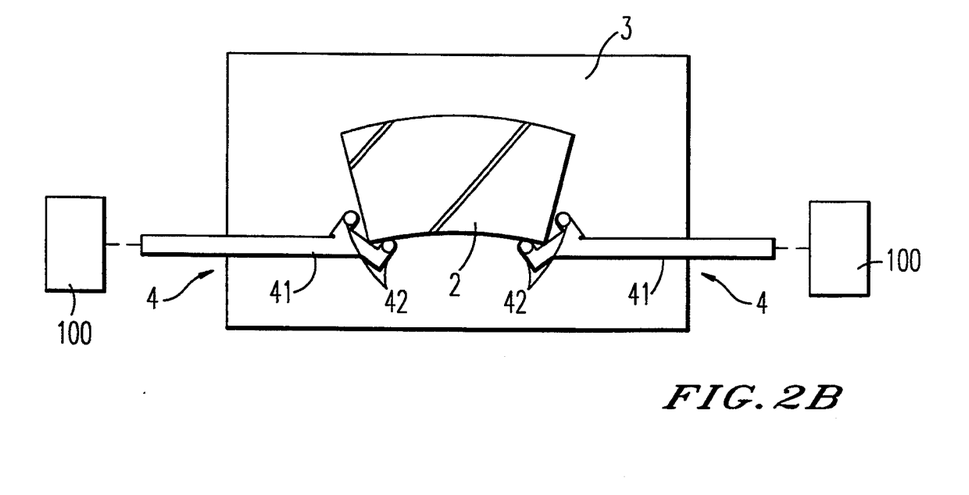
FIG. 2b is a bottom view showing the positioning means.

In FIGS. 2a and 2b showing an embodiment of the positioning means used for the present invention, arm portions 41 of the positioning means 4 are extended below the glass plate sucking and suspending device 3 for sucking and suspending the glass plate 2 so that they can be advanced and retracted by the schematically illustrated advancing and retracting means 100 (FIG. 2b); in the direction parallel to the suspending surface 31 of the sucking and suspending device 3. The advancing and retracting means 100 can be a mechanism such as a hydraulic actuator or an electric motor which is capable of achieving the above-noted directional movement of the arm portions 41.

Glass plate supporting portions 42 made of silicon nitride series ceramics are connected to the upper part of the top end of each of the arm portions 41 so as to receive edges of the glass plate 2. The glass plates supporting portions 42 are moved to predetermined positions by means of the arm portions 41 in the direction parallel to the suspending surface 31 to thereby receive the edges of the glass plate 2 and to correctly determine the position of the glass plate 2.

The arm portions may be so disposed as to extend outside the furnace and to be mechanically or electrically controlled from the outside of the furnace, or they may be placed inside the furnace so that they are controlled from the outside.

In the description of this specification, the top end of the arm implies a neighboring portion including the top end of the arm portion, and the glass plate supporting portion 42 is located the upper part of the arm portion.

Figure 3:
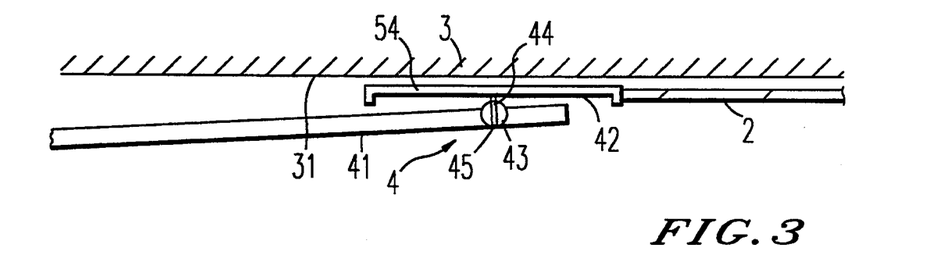
FIG. 3 is an enlarged cross-sectional view showing the positioning means in more detail.
Figure 4:
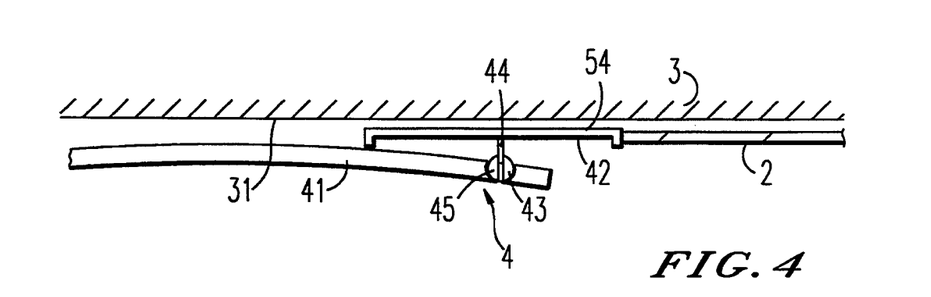
FIG. 4 is an enlarged cross-sectional view showing the positioning means in more detail.

FIGS. 3 and 4 are respectively enlarged cross-sectional views showing the positioning means in more detail.

The glass plate supporting portions 42 of the positioning means 4 are sucked and suspended by the glass plate sucking and suspending device 3 in such a manner that the distance between suspension surface 31 of the glass plate sucking and suspending device 3 and the main body portion 54 of the glass plate supporting portions 42 is a predetermined value.

Further, the glass plate supporting portions 42 are sucked and suspended by the glass plate sucking and suspending device 3 in such a manner that the distance between the suspension surface 31 and the main body portion 54 is substantially same as the distance between the glass plate 2 and the glass plate sucking and suspending device, whereby the glass plate 2 sucked and suspended by the device 3 can be certainly received.

In the present invention, the glass plate supporting portions are sucked and suspended by the glass plate sucking and suspending device to keep a predetermined distance. The distance indicates the distance between the suspension surface of the glass plate sucking and suspending device and the main body portion of the glass plate supporting portions by which the glass plate supporting portions can be substantially sucked. Accordingly, the suspending distance of the glass plate supporting portions means the above-mentioned distance.

Further, the glass plate supporting portions 42 are attached to each of the arm portions 41 by means of a joint portion 43 so that the glass plate supporting portions 42 are shifted to predetermined positions when the arm portions 41 is advanced and retracted in the direction parallel to the suspension surface 31 of the glass plate sucking and suspending device 3.

With respect to the direction perpendicular to the suspending surface 31 of the glass plate sucking and suspending device 3, a guide member 44 attached to the glass plate supporting portions 42 is merely inserted into an inserting portion 45 which extends vertically in the joint portion 43. Accordingly, the glass plate supporting members 42 and the arm portions 41 are independently movable in the vertical direction. Accordingly, when the glass plate supporting portions 42 are sucked and suspended by the glass plate sucking and suspending device 3, the distance between the glass plate sucking and suspending device 3 and the glass plate supporting portions 42 is kept constant, whereby the distance between the glass plate supporting members 42 and the glass plate sucking and suspending device 3 is not changed even though the arm portion 41 is deflected or bent in the vertical direction. Thus, the glass plate can be correctly positioned.

The thickness of a glass plate for a vehicle is generally about 1 mm –5 mm. In many cases, the glass plate 2 is maintained with a gap of about 0.5 mm from the suspension surface. Accordingly, when the thickness of the peripheral edge surface of the glass plate supporting portion 42 is about 5 mm, it is unnecessary that the distance between the glass plate 2 and the suspension surface 31 is the same as the distance between the main body portion 54 of the glass plate supporting portion 42 and the suspension surface 31. In this case, the distance between the glass plate supporting portion 42 and the suspension surface 31 can be determined depending on the shape and material used for the glass plate supporting portion 42, and it is preferable to maintain the distance between the glass plate supporting portion 42 and the suspension surface 31 to be slightly smaller than the distance of the glass plate and the suspension surface.

The shape of the glass plate supporting portion 42 is preferably circular in view of the bottom portion of it because a circular glass plate supporting portion can certainly support the glass plate. In particular, as shown in FIG. 2, when each of the glass plate supporting portions is provided with two supporting portions at the top end of the arm portions, the glass plate can be certainly supported at four points from the downstream side in the transferring direction. In this case, no excessive force is applied to a specified portion. In FIG. 2, two arm portions are used. However, the number of arm portions can be suitably selected.

Since the glass plate supporting portions 42 is sucked and suspended by the glass plate sucking and suspending device 3 having a sucking function to suck and suspend the glass plate at a predetermined distance, a glass plate supporting portion 42 having a long diameter of about 30 mm is preferably used although the thickness of the main body portion 54 is about 2 mm –3 mm. However, the shape and dimensions of the glass plate supporting portions are not limited to the above-mentioned because the ability of the glass plate supporting portion for sucking and suspending the glass plate is determined depending on the material used for the glass plate supporting portion and various other conditions. Namely, since the density is different depending on the material used, the sucking force may be insufficient even when the glass plate supporting portion having the same size is used. Further, the sucking force may be insufficient due to the thickness and the surface area of the glass plate supporting portion even when it is formed of the same material. On the contrary, the sucking force may be excessive. Accordingly, the material and the shape of the glass plate supporting portion is determined in consideration of various conditions.

When the thickness of the main body portion of the glass plate supporting portion 42 is about 2 mm –3 mm, the thickness of the peripheral edge surface of the glass plate supporting portion 42 is preferably about 5 mm as described above. Accordingly, the shape in cross section of the glass plate supporting portion is in a disk-like shape wherein the peripheral edge portion projects upwardly or downwardly from the main body portion, or the peripheral edge portion projects upwardly and downwardly.

The apparatus and the method of the present invention are not restricted to only the embodiment described and illustrated in the drawings. For instance, the shape of the upper and lower molds can be determined so as to meet the shape of the glass plate to be obtained. For instance, the lower mold may be a convex shape and the upper mold may be a concave shape, or vice versa. Or the upper and lower molds may have a substantially S-like shape in cross section so that the shape of the glass plates bend-shaped is a complicated curved surface.

Besides the press-bend-shaping method by using the upper and lower molds as described in the above-mentioned embodiment, a bend-shaping method by utilizing the deadweight of softened glass plates may be used, or a ring-shaped deadweight bend-shaping mold wherein only a lower mold is used may be used.

The heating furnace and the transferring means are not limited to those described in the drawings. The transferring means may be constituted by rollers or another means as far as softened glass plates can be smoothly transferred.

The transferring means is inclined downwardly toward the downstream side in the transferring direction so that the glass plate can be smoothly transferred. Further, it is possible to transfer the glass plate without forming the downwardly inclined portion by engaging an edge surface of the glass plate with a bar or the like moved to the downstream side in the transferring direction. Besides the above-mentioned, various types of transferring means may be used. In particular, the provision of the downwardly inclined portion is preferable because the glass plate is automatically transferred in the heating furnace whereby no excessive force is applied to the glass plate.

The transfer of the glass plate from the transferring means to the glass plate sucking and suspending device is effected in the balance of an air-blasting force from the AFB and an air sucking force by the glass plate sucking and suspending device when the transferring means is the AFB. Specifically, when the end portion of the glass plate at the downstream side in the transferring direction is passed beyond the region of the AFB and comes to the region of the glass plate sucking and suspending device, the edge portion of the glass plate dose not receive sufficiently the air-blasting force of the AFB. However, since the edge portion of the glass plate already reaches the region where the air-sucking force of the glass plate sucking and suspending device is provided, the glass plate can be transferred in substantially a horizontal state.

Further, it is possible to adjust the balance between the air-blasting force of the AFB and the air-sucking force of the glass plate sucking and suspending device by controlling the quantity of air discharged from the AFB. Alternatively, since the glass plate sucking and suspending device comprises the ASB, it is possible to change the air-sucking force by adjusting air-ejecting orifices and air sucking orifices formed in a surface of the AFB.

The glass plate sucking and suspending device is capable of reciprocating movements between the transferring means and the lower mold for bend-shaping. When the transferring means is constituted by rollers, the glass plate sucking and suspending device is moved to a position in the vicinity of the transferring means to receive the glass plate so that the edge surface of the glass plate is brought to contact with the glass plate supporting portions.

When the transferring means is constituted by AFB, the air-blasting force from the AFB and the air-sucking force of the glass plate sucking and suspending device are balanced. Accordingly, the region of the transferring means and the region of the glass plate sucking and suspending device are preferably not overlapping, namely, the boss regions are preferably continuous.

Since glass plate supporting portions are kept at a predetermined level by the glass plate sucking and suspending device, there is no danger of causing uncertainty of position due to the deformation or the bending of the arm portions of the positioning means. Accordingly, the arm portions may be made of material such as metal which is easily deformed by heat, However, in order to obtain a correct position to the glass plate stably, it is preferable to use material which inherently does not cause bending, such as silicon nitride series ceramics, silicon carbide series ceramics or the like which have a low expansion coefficient. Accordingly, the silicon nitride series ceramics or silicon carbide series ceramics having a low expansion coefficient is preferably used for the arm portions, the joint portion and the glass plate supporting portion of the positioning means so as not to cause the deformation or the bending of them.

The arm portions and the glass plate supporting portions are connected by means of the joint portion. In the above-mentioned embodiment and the drawings thereof, the guide member 44 extending to the glass plate supporting portions 42 in the direction perpendicular to the suspending surface of the glass plate sucking and suspending device 3 is inserted into the inserting portion 45 of the joint portion 43, which is extended to the direction perpendicular to the suspending surface.

The joint portion 43 is in substantially a spherical shape and is provided with the inserting portion 45. A curved recess portion is formed at the top end of each of the arm portions 41 so that the spherical-like joint portion 43 is fitted to it. Boron nitride or the like may be interposed between the recessed portion of the arm portion 41 and the joint portion 43 so as to obtain smooth contact.

When the arm portion 41 is deflected downwardly by heat (FIG. 4), the direction of an opening in the recess portion is changed. In the positioning means having the construction described above, however, slipping takes place between the spherical-like joint portion 43 and the recessed portion of the arm portion 41, and there is no change in the direction of the joint portion 43, particularly the direction of the inserting portion 45 even when the direction of the opening in the recess portion is changed. Accordingly, the glass plate 2 can be supported at a correct position, without changing the distance between the glass plate supporting portions 42 and the suspension surface 31 of the glass plate sucking and suspending device 3, in the condition that the guide member 44 is inserted in the inserting portion 45.

The guide member 44 has a predetermined diameter and length while the inserting portion 45 has a predetermined diameter and depth so as not to separate the guide member 44 from the inserting portion 45 in the direction parallel to the suspension surface 31. Although the joint portion 43 and the recess portion of the arm portion 41 have good slipping property, the recess portion is formed to have certain radius of curvature and depth so that the joint portion 43 itself dose not slip out from the recess portion. By advancing and retracting the arm portions 41 in the direction parallel to the suspension surface 31, the glass plate supporting portions 42 can be advanced and retraced together with the arm portions 41 so that the glass plate can be positioned at a predetermined position.

The glass plate supporting portions may be connected to the arm portions so that the glass plate supporting portions and the arm portions can cooperate with each other in the direction parallel to the suspension surface by means of a shaft extending in the vertical direction to the suspension surface. Alternatively, the guide member of the glass plate supporting portions 42 is inserted to the inserting portion 14 which is directly formed in the arm portions 41 to function as the joint portion, whereby the glass plate supporting portions 42 can be moved in association with the arm portions 41 in the direction parallel to the suspension surface, while they are movable in the vertical direction FIGS. 5a and 5b. In this case, the diameter of the inserting portion may be increased, whereby the direction of the guide member is kept to be perpendicular to the suspension surface even when the arm portion is curved to change the direction of the inserting portion. Thus, the glass plate supporting portions is kept by the glass plate sucking and suspending device at a predetermined distance from the suspension surface.

Figure 5A:
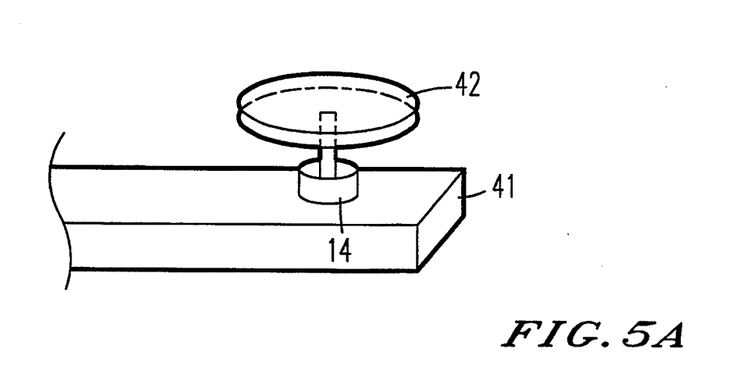
FIGS. 5a 5b are enlarged cross-sectional views showing another embodiment of the positioning means of the present invention.
Figure 5B:
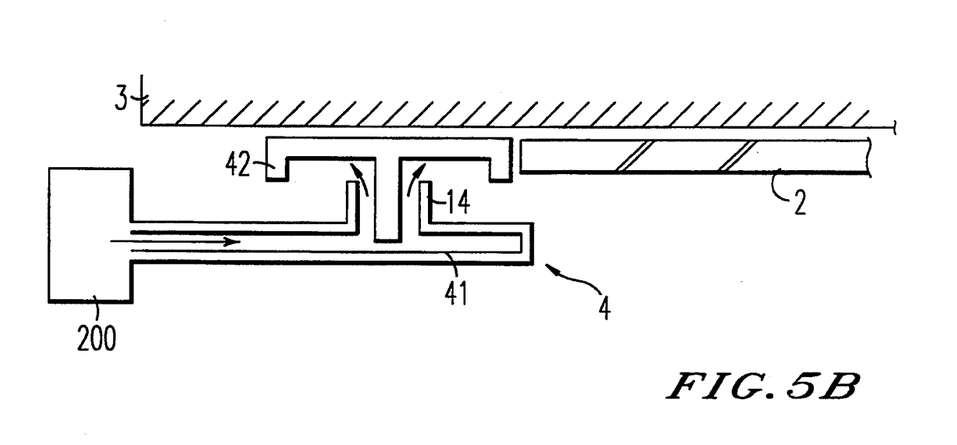

In this case, a cavity is formed in each of the arm portions and an air-blasting means 200 such as an air pump may be provided at the outside in the longitudinal direction of the arm portion so that air is ejected form the outside in the longitudinal direction of the arm portion through the inserting portion via the cavity. The air ejected through the inserting portion provides a floating force upwardly to the glass plate supporting portions. The air-blasting means performs an auxiliary function to keep the distance between the glass plate supporting portions and the suspension surface at a predetermined value in a case that the air-sucking force of the glass plate sucking and suspending device is insufficient to suck and suspend the glass plate supporting portions because of the shape and the material of the glass plate supporting portions.

Since the glass plate supporting portions and the arm portions can be moved independently in the direction perpendicular to the suspension surface, the glass plate supporting portions are not influenced by the movement of the arm portions in the vertical direction, and the distance between the glass plate supporting portions and the glass plate sucking and suspending device can be maintained at the same level.

The shape of the joint portion is not limited. However, when the joint portion has substantially a spherical shape as described above, the inserting portion of the joint portion can be kept in the direction perpendicular to the suspension surface even when the longitudinal direction of the arm portion is changed due to the bending.

Obviously, numerous modifications and variations of the present invention are possible in light of the above teachings. It is therefore to be understood that within the scope of the appended claims, the invention may be practiced otherwise than as specifically described herein.

What is claimed is:

1. A method of bend-shaping a glass plate the method comprising the steps of:
    transferring a glass plate by means of a transferring means in a heating furnace from a first position in said heating furnace to a second position in said heating furnace which is adjacent to a glass plate sucking and suspending device and is downstream of the transferring means;
    sucking and suspending the glass plate by means of said glass plate sucking and suspending device;
    moving arm portions of a positioning means disposed at a lower portion of the glass plate sucking and suspending device in a direction substantially parallel to a glass plate suspension surface of the glass plate sucking and suspending device;
    sucking and suspending glass plate supporting portions which are each connected to a top end of each of the arm portions by a joint portion so as to be movable with respect to the arm portions and permit a distance between the glass plate supporting portions and the glass plate sucking and suspending device to be kept at a predetermined value;
    supporting an edge portion of the glass plate by the glass plate supporting portions, and positioning the glass plate to a predetermined position by advancing and retracting the arm portions in the direction parallel to the suspension surface;
    moving the glass plate sucking and suspending device on which the glass plate is sucked and suspended to an upper portion of a bending mold;
    placing the glass plate on the bending mold; and
    bending the glass plate on the mold.

2. A glass plate bend-shaping apparatus which comprises:
    a heating furnace;
    a transferring means for transferring a glass plate in said heating furnace;
    a bend-shaping mold disposed at a downstream side of the transferring means to shape the glass plate softened by heat in the heating furnace;
    a glass plate sucking and suspending device disposed at an upper portion in the heating furnace and the downstream side of the transferring means to put the glass plate from the transferring means onto the bend-shaping mold, said glass plate sucking and suspending device having a glass plate suspension surface; and
    a positioning means for positioning the glass plate at a predetermined position with respect to the glass plate sucking and suspending device;
    wherein the positioning means comprises:
        arm portions disposed below the glass plate sucking and suspending device;
        means for advancing and retracting the arm portions in a direction substantially parallel to the glass plate suspension surface of the glass plate sucking and suspending device;
        glass plate supporting portions each provided on a top end of each of the arm portions to support an edge portion of the transferred portion of the transferred glass plate; and
        joint portions for connecting the arm portions with the glass plate supporting portions and providing for a vertically adjustable interconnection between the arm portions and the glass plate;
    wherein:
        each of said glass plate supporting portions is connected to each of the arm portions through said joint portion so as to advance and retract in the direction parallel to the glass plate suspension surface in association with the movement of the arm portion in the direction parallel to the suspension surface while the glass plate supporting portions are held by the glass plate sucking and suspending device to have a predetermined gap therebetween with respect to the direction substantially parallel to the glass plate suspension surface of the glass plate sucking and suspending device; and
        the vertically adjustable interconnection between the arm portions and the glass plate supporting portions permit a distance between the arm portion and the glass plate supporting portion to be adjustable for maintaining the gap between the glass plate supporting portion and the glass plate sucking and suspending device constant with respect to a direction substantially vertical to the glass plate suspension surface.

3. The glass plate bend-shaping apparatus according to claim 2, wherein the joint portion comprises an inserting portion and the glass plate supporting portions are each provided with a guide member extending in a direction substantially perpendicular to the suspension surface of the glass plate sucking and suspending device so that the guide member is inserted into said inserting portion of the joint portion which is provided at the top end of each of the arm portions, the inserting portion being provided in the direction substantially perpendicular to the suspension surface of the glass plate sucking and suspending device.

4. The glass plate bend-shaping apparatus according to claim 2 or 3, wherein the top end of each of the arm portions comprises a curved recess, and the joint portion is fitted to said curved recess, said joint portion substantially having a spherical shape.

5. The glass plate bend-shaping apparatus according to any one of claims 2 or 3, wherein at least one of the group consisting of the arm portions and the glass plate supporting portions is formed of silicon nitride ceramics or silicon carbide ceramics.

6. The glass plate bend-shaping apparatus according to claim 3, wherein each of the arm portions comprises a cavity which leads to said inserting portion, and an air-blasting means for providing air to said cavities, said cavities directing air from the air-blasting means to the glass plate supporting portion through the inserting portion to thereby float the glass plate supporting portion.

* * * * *